(No Model.) 7 Sheets—Sheet 1.

W. A. LORENZ.
PAPER BAG MACHINE.

No. 591,173. Patented Oct. 5, 1897.

Witnesses:
Jennie Nellis
A. S. Howe

Inventor:
William A. Lorenz
By his Attorney
W. H. Boniss.

(No Model.)

W. A. LORENZ.
PAPER BAG MACHINE.

No. 591,173.      Patented Oct. 5, 1897.

Witnesses:
Jennie Nellis
A. S. Howe

Inventor:
William A. Lorenz
By his Attorney
W. H. Honiss (No Model.) 7 Sheets—Sheet 5.

W. A. LORENZ.
PAPER BAG MACHINE.

No. 591,173. Patented Oct. 5, 1897.

Fig. 5

Witnesses:

Inventor:
William A. Lorenz
By his Attorney (No Model.) 7 Sheets—Sheet 6.

W. A. LORENZ.
PAPER BAG MACHINE.

No. 591,173. Patented Oct. 5, 1897.

Witnesses:
Jennie Nellis
A. S. Howe

Inventor:
William A. Lorenz
By his Attorney
W. H. Honiss (No Model.) 7 Sheets—Sheet 7.

W. A. LORENZ.
PAPER BAG MACHINE.

No. 591,173. Patented Oct. 5, 1897.

Witnesses:
Jennie Nellis
A. S. Howe

Inventor:
William A. Lorenz
By his Attorney
W. H. Honiss

UNITED STATES PATENT OFFICE.

WILLIAM A. LORENZ, OF HARTFORD, CONNECTICUT, ASSIGNOR TO ALBERT H. WALKER, TRUSTEE, OF SAME PLACE.

PAPER-BAG MACHINE.

SPECIFICATION forming part of Letters Patent No. 591,173, dated October 5, 1897.

Application filed January 6, 1897. Serial No. 618,201. (No model.)

*To all whom it may concern:*

Be it known that I, WILLIAM A. LORENZ, a citizen of the United States, residing at Hartford, in the county of Hartford and State of Connecticut, have invented certain new and useful Improvements in Paper-Bag Machines, of which the following is a full, clear, and exact specification.

This invention relates to new and improved machinery for manufacturing paper bags at a high rate of speed, being herein shown and described in its adaptation to the manufacture of what are now technically known as "bellows-sided square-bottomed" bags, known also commercially as "self-opening square" bags.

The machinery now most generally used for the commercial manufacture of paper bags of all kinds operates upon a continuous web of paper which is drawn from a roll over a former, the edges of the web being joined and pasted, thus forming a continuous flattened tube, which is then severed into blanks of a length suitable for the bags to be made. These blanks are rapidly passed onto devices which form the bottom folds upon one end of the blank and deliver the completed bag at the other end of the machine. What are now considered the leading types of paper-bag-making machines are represented in United States Patent No. 561,951, of April 26, 1887, to W. A. Lorenz and W. H. Honiss, and in the United States Patent to C. D. Stilwell, No. 407,794, of July 30, 1889, both of which are adapted to the manufacture of bellows-sided square-bottomed bags. In all forms of paper bags the operation of forming the bottom folds is the most difficult one involved in their manufacture, and particularly is this true with reference to the square-bottomed bag, which requires for the formation of its folds several coacting devices having more or less complexity of structure and movement. This intricacy and complexity of the devices is largely increased by the circumstance that as at present arranged they are required to follow the rapidly-traveling blank during the time required to perform the bottom-folding operation thereon, the folding devices being mounted upon rotating or reciprocating folding-beds or carriages, which after the completion of the folding operation upon one blank must return to their first position to receive and operate upon the succeeding blank. Therefore these machines must be provided not only with mechanism for operating their folding devices, but in addition thereto with mechanism for moving the folding-beds or carriages upon which these folding devices are mounted. Moreover, the difficulty of communicating the desired rate and kind of movement to folding devices mounted upon traveling beds largely increases the general complexity of the entire machine. Where but one set of these folding devices is employed to fold the blanks successively cut from a continuously-moving tube, the time required for their folding operation and then for their return to their first position is so great as to impose a serious limitation upon the productive capacity of the machine, inasmuch as the simple operations of forming and drawing the tube into the machine and severing the blanks therefrom may be performed with almost limitless rapidity.

The object of my present invention is to provide a method and apparatus whereby the rapidly-succeeding blanks may be directed into two or more sets of bottom-folding devices, so that each device operates upon alternate blanks, thereby allowing each device so much time in which to perform its operation that it need not travel with the blank, but so that each blank rests stationary so far as longitudinal progress is concerned during the time that its set of bottom-folding devices perform their operations upon it. I am thus enabled to greatly simplify the form and arrangement of these bottom-folding devices, mounting them upon stationary folding-beds, whereby their connection with each other and with the cams which operate them may be maintained with fewer and simpler parts than heretofore, besides dispensing with the mechanism heretofore employed for moving the traveling folding-bed.

The machine illustrated in connection with this application shows a former for making the tube in connection with two sets of diamond-folding devices. No means are herein shown for pasting and folding the end flaps of the diamond, as no new devices for this purpose are included in the machine of my present invention, it being the intention to deliver the diamond-folded blanks from my present machine to any of several well-known devices for pasting and folding the flaps and thus converting the diamond-folded-bag blanks into completed bags. I have also shown in connection herewith three modifications of my improved means for diverting and directing each succeeding blank to its proper set of folding devices.

Fig. 3ª is a side view of the guide-rolls, showing them in the operation of gripping a blank which is to be deflected or guided to the upper set of bottom-folding devices. Fig. 8 is a plan view, and Fig. 9 a side view, showing a modified form of switching device for diverting the blanks alternately to the two sets of folding devices. Fig. 10 is a fragmentary side view of a portion of the switching device of Fig. 9, showing it in a different position. Fig. 11 is a plan view.

Figure 1:
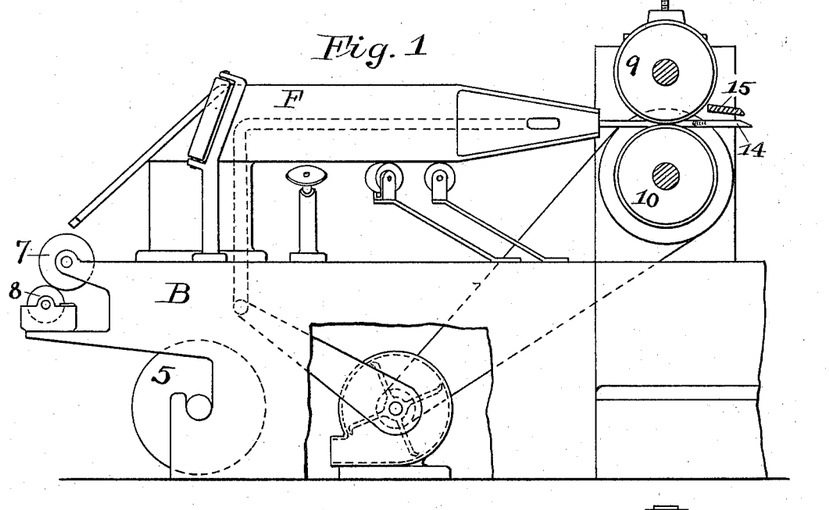
Figure 1 of the drawings is a side view, and Fig. 2 a plan view, of a well-known type of machine for producing bellows-sided tubing from a web of paper.
Figure 2:
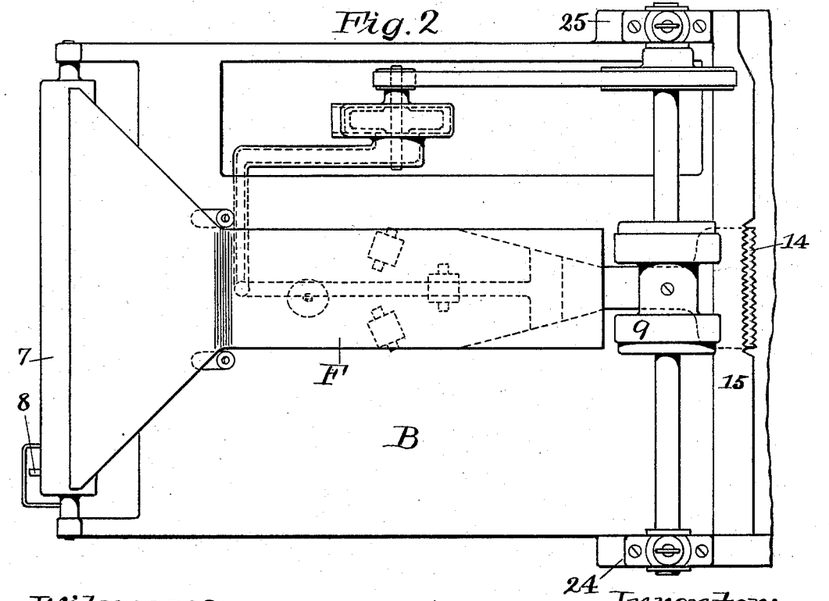
Figures 3, 7:
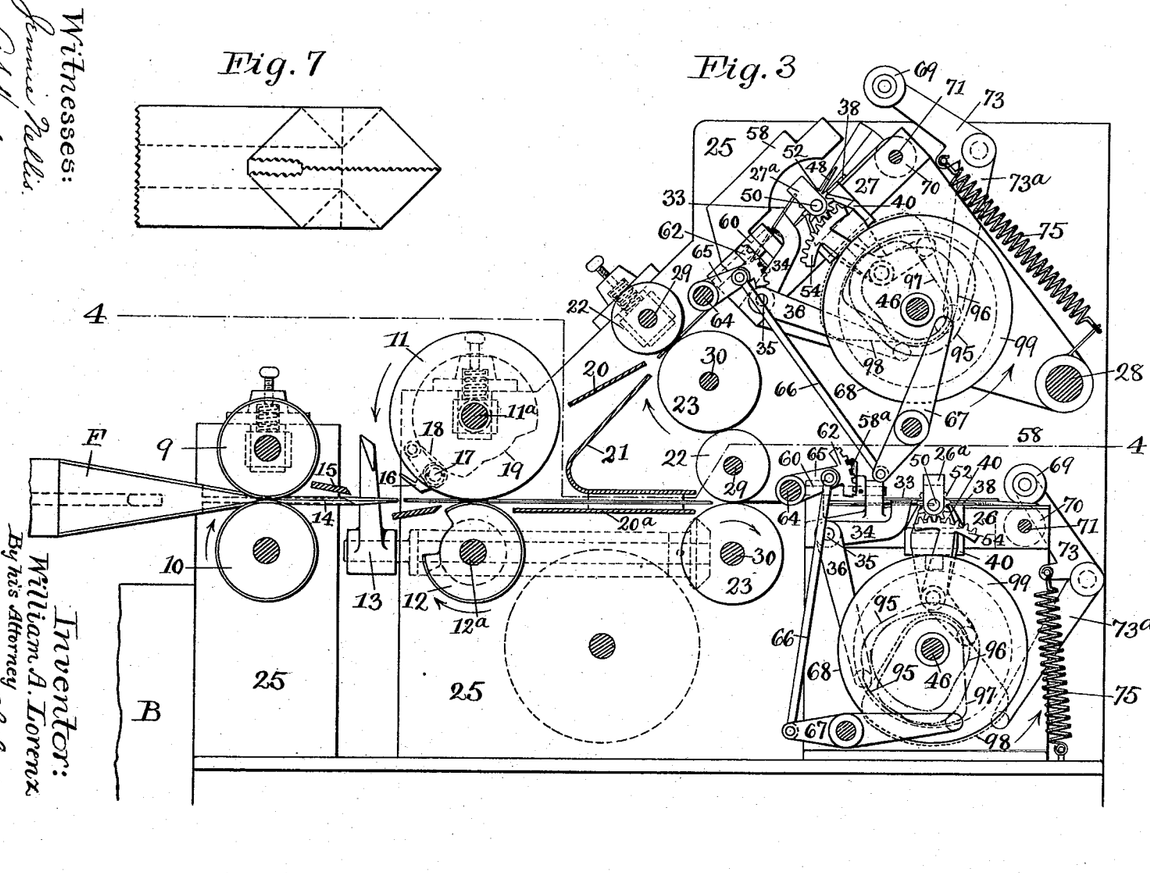
Fig. 3 is a side view in section taken on the line 3 3 of Fig. 4, showing that portion of my improved machine lying to the right of the former and of the drawing-rolls shown in Fig. 1.
Fig. 7 is a plan view of a bellows-sided blank in the well-known diamond form in which it is delivered from my present machine after being folded by my improved devices.

The mechanism shown in Figs. 1 and 2 is substantially like that shown in Figs. 2 and 3 of Letter Patent No. 331,721, of December 1, 1885, to W. A. Lorenz and W. H. Honiss. It consists of the former F, mounted upon the bed B, over which the web of paper is drawn from the roll 5 around the guide-roll 7, receiving its paste from the paster-roll 8, as fully set forth in the patent last referred to. The former is provided with pneumatic apparatus for exhausting the air from the interior of the tube in order to tuck the sides inwardly into the well-known bellows-sided form. The tube is drawn from the former by means of the drawing-rolls 9 and 10, mounted in suitable bearings in the frames 24 and 25 of the machine. The tube passes from the drawing-rolls to and between the guide-rolls 11 and 12, and the tube is severed into blanks of the desired length by means of the striker 13, which at each revolution forces the tube against the knives 14 and 15 and severs it in a manner well known in this art, the front end of the blank being firmly held between the guide-rolls while being severed. As the forward end of the tube passes from the knives to the guide-roll 11 it is gripped thereto by means of the gripper 16, which is mounted upon that roll and is connected by means of the shaft 17 and the arm 18 with the cam 19, fixed to the frame 19 and extending adjacent to the guide-roll 11. The upper feed-roll 11 is of such a diameter that it makes only half a revolution for each of the blanks passing beneath it, and it therefore follows that only the alternate blanks will be thus engaged by the gripper, and these blanks are held to that roll by the gripper until it reaches the opening between the guide-plates 20 and 21, when it is released by the opening of the gripper and passes up the incline passage between those guide-plates into the bite of the feed-rolls 22 and 23. The alternate blanks which are not seized by the gripper 16 pass straight through between the guide-plates 21 and 20ª to the lower set of diamond-folding devices.

The guide-rolls 11 and 12 are fixed upon the shafts 11ª and 12ª, respectively, and these shafts, as well as the greater portion of the others pertaining to this portion of the machine, are journaled in the side frames 24 and 25. The lower set of diamond-folding devices is mounted upon the stationary folding-bed 26, fixed upon the bed B of the machine, while the upper set of diamond-folding devices is mounted upon the stationary folding-bed 27, which is supported upon the cross-brace 28 between the side frames 24 and 25. In all other respects these two sets of bottom-folding devices are similar in construction and mode of operation, and therefore the following description of one will apply to both.

Figures 3A, 6:
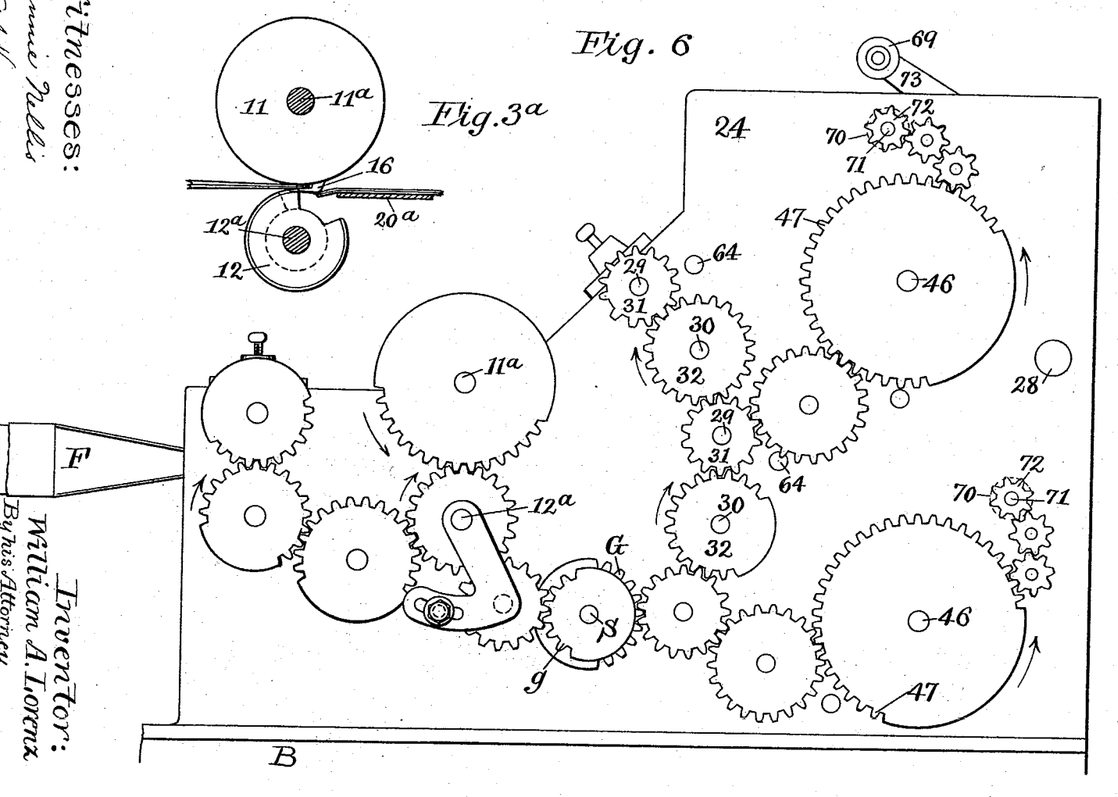
Fig. 6 is a right-hand side view corresponding to that of Fig. 3, showing the gearing for the shafts and rolls of the latter figure.

The feed-rolls 22 and 23 are fixed upon the shafts 29 and 30, respectively, these shafts being journaled in the side frames 24 and 25 and receiving their motion by means of the gears 31 32, respectively, from the train of gearing shown in Fig. 6.

The transverse presser-plate 33 is riveted or otherwise securely attached to arms 34, fixed to the shaft 35, which is journaled in the folding-bed 26 and is connected by means of the cam-arm 36 with a cam-groove 37 cut on the inside of the cam-wheel 44. (Best seen in Figs. 3 and 5.) By means of this cam-path the presser-plate is caused to move up and down between the two positions occupied by the presser-plates shown in Fig. 3, these plates being raised, as represented, by the upper plate to allow the blank to be fed to position beneath it, after which it clamps that blank down upon the surface of the folding-bed, as shown, by the lower presser-plate of Fig. 3. The front edge of the presser-plate is located at the desired position of the primary transverse fold and serves to define the line of that fold.

The bag-blanks are diamond-folded into the form shown in Fig. 7 by means of the tuck-blades 38 and 39 and the box-blades 48 49, (shown in Fig. 4,) the former being fixed upon or integral with the slides 40 41, respectively. These slides are mounted upon projecting portions 26ª 26ᵇ of the folding-bed 26 in the case of the lower set of devices, while the corresponding slides of the upper mechanism are mounted upon similar projections 27ª 27ᵇ of the folding-bed 27. (Best seen in Figs. 3 and 5.) The slides 40 and 41 are provided with lugs which engage in the paths 42 43 of the cam-wheels 44 and 45, respectively. These cams are mounted upon the shaft 46, which is journaled in the side frames 24 and 25 and has fixed upon its outer end the gear 47, by means of which it is connected with the train of gearing shown in Fig. 6. The extent of the motion communicated to the slides is sufficient to carry their respective folding-blades into and out of the side tucks of the blank.

The box-blades 48 and 49 (best shown in Fig. 4) are fixed upon the shafts 50 and 51, journaled in the slides 40 and 41, respectively. These shafts extend outwardly, as shown also in Fig. 5, through the extensions 26ª and 26ᵇ of the folding-bed 26 and are provided with the pinions 52 53, which fit into recesses of these extensions, whereby they are held against lateral movement, being splined upon the shafts 50 51, so as to allow the latter to follow the motion of their respective slides 40 and 41. The sectors 54 and 55 are pivotally mounted upon the extensions 26ª and 26ᵇ and mesh with the pinions 52 and 53, the opposite ends of the sectors being adapted to engage in the cam-grooves 56 and 57, respectively, as best shown in Figs. 3 and 5, whereby a suitable oscillatory movement is imparted to the box-blades 48 and 49, moving them from the position occupied by the upper pair of these blades in Fig. 3 to that occupied by the lower pair in the same figure. The axes of the shafts 50 and 51 are substantially coincident with each other and with the front or primary fold-defining edge of the presser-plate 33.

Figure 4:
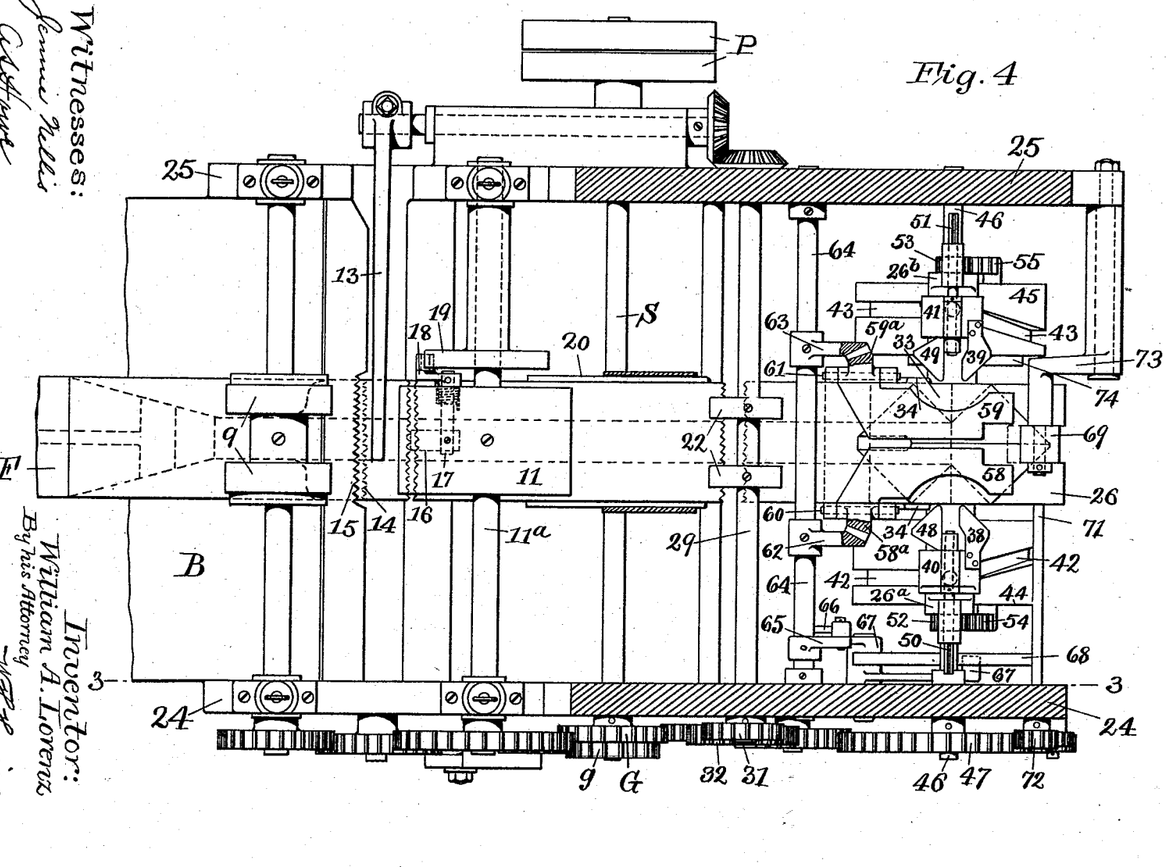
Fig. 4 is a plan view, partly in section, taken on the line 4 4 of Fig. 3, showing therefore a portion of the former, the drawing-rolls, and the lower set of bottom-forming devices.
Figure 5:
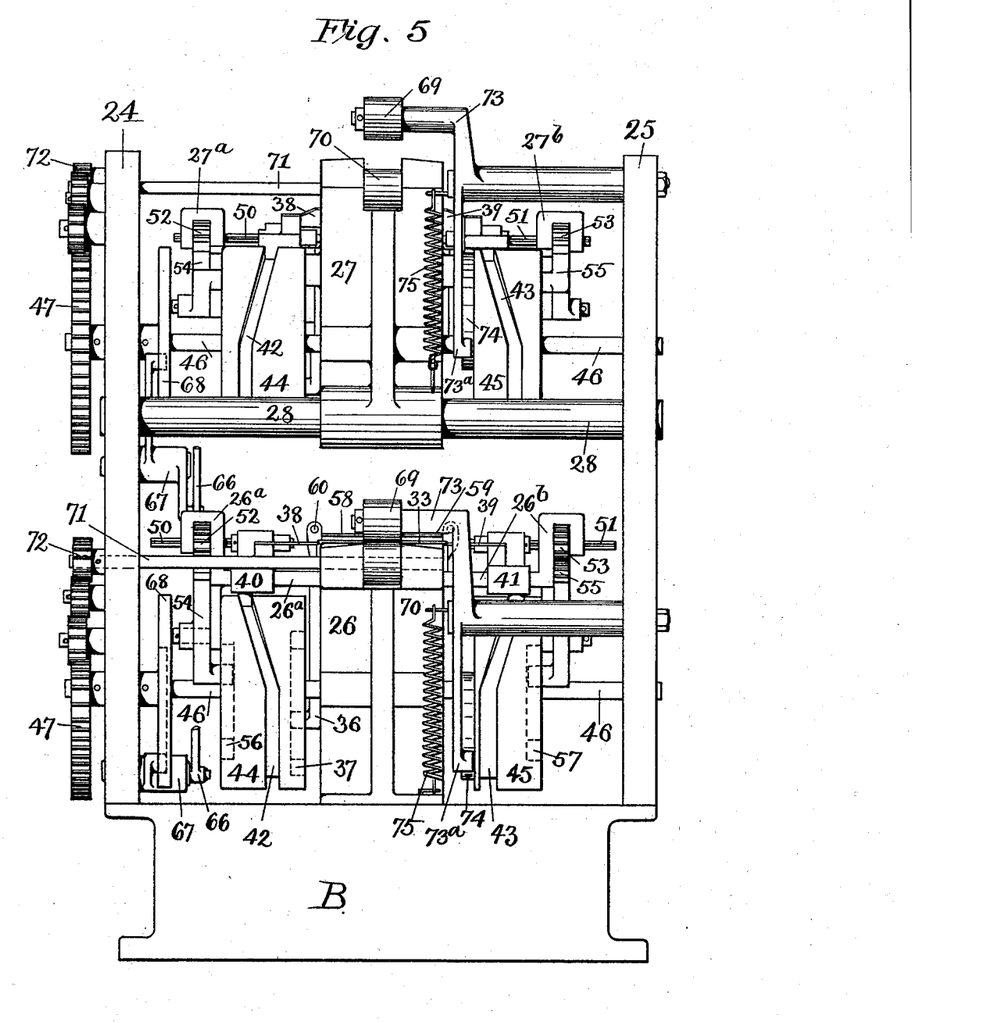
Fig. 5 is an end view of my machine, looking from the right-hand side of Fig. 3, showing both sets of bottom-folding devices, one above the other.

The function of the blades 38 39 48 49 is to fold the front end of the blank into the diamond form shown in Figs. 4 and 7 in the manner already well known in this art. After their folding operation is completed the blades are withdrawn, as shown in Fig. 4, beyond the marginal edges of the blank, the diamond folds of which are still further flattened and retained in their flattened condition by means of the side-folder plates 58 59, which stand, as shown in the upper portion of Fig. 3, while the bottom-folding plates are performing their operation, after which they are folded down to the position shown in the bottom portion of Fig. 3 and in Fig. 4. The side-folder plates are hinged at 60 and 61 to the folding-beds 26 and 27, and are herein shown to be provided with beveled sector portions 58ª 59ª, meshing with the beveled sector-gears 62 and 63, fixed upon the shaft 64, as best shown in Fig. 4. That shaft is connected by means of the arm 65, the connecting-rod 66, and the cam-arm 67 with a groove cut in the cam 68, by means of which a suitable oscillatory movement is imparted to the folder-plates 58 and 59. After the blank has been diamond-folded and flattened it is removed from the machine by means of the delivery-rolls 69 and 70, the latter of which rotates continuously with the shaft 71, that shaft being journaled in the frame 24 and in the folding-bed 26 and having fixed thereon the pinion 72, by means of which it receives continuous rotary motion from the train of gears shown in Fig. 6. The upper delivery-roll 69 is loosely mounted upon the cranked arm 73, that arm being pivotally mounted upon the side frame 25 and being provided with a lever portion 73, adapted to engage with the cam 74, as best shown in Figs. 3 and 5, being held into engagement with that cam by means of the spring 75, attached between that arm and a convenient fixed portion of the framing or bed of the machine. By means of the cam 74 the upper delivery-roll 69 is raised to the position shown in the upper set of mechanism of Fig. 3 while the blank is being folded into its diamond-shaped form, after which the roll 69 is brought into the position shown in the lower set of mechanism of Fig. 3, thus engaging the diamond-folded blank between the rolls 69 and 70 and delivering it from the machine to suitable devices for pasting and cross-folding the end flaps of the diamond, and thus completing the bag.

In the two sets of mechanisms shown in side view in Fig. 3 the center line of the cam-path for the presser-plate 33 is indicated by the line 95. The center line of the path of the box-blade cams is indicated by the line 96. The center line of the cam-path of the side-folder cam 68 is indicated by the line 97. The center line of the path of movement of the delivery-roll arm 73 is indicated by the line 98, while the grooves in the tuck-blade slide-cams are indicated by 42.

Movement is communicated to the machine by means of the tight and loose pulleys P, which are driven by means of a belt from any convenient counter-shaft. One of these pulleys is loose, the other being fixed upon the shaft S, which is journaled in the side frames 24 and 25 of the machine and has upon its opposite ends the pinion-gears G g. As shown in Fig. 6, the drawing and guide rolls are connected by means of their respective gears with the smaller pinion g, while the feed-roll and the two sets of diamond-folding mechanisms are driven by means of the lower pinion G. The feed-rolls 22 and 23 are therefore driven at a linear speed greater than that of the drawing and guide rolls. Therefore when the leading ends of the blanks are gripped by the feed-rolls 22 and 23 they operate to draw that blank away from the leading end of the succeeding blank, thus making a space between the two blanks to enable the gripper 16 to more readily pass between them. The lower guide-roll 12 is also cut away in order to release the blank therefrom as soon as its leading end is gripped by the feed-rolls 22 and 23, and also to form a recess into which the gripper 16 may pass while in its open position in the operation of gripping the leading end of the succeeding blank, as best shown in Fig. 3ª.

The mode of operation of this machine is as follows: A roll of paper is placed upon the machine and the end of the paper web is drawn over and around the former and between the drawing-rolls 9 and 10, by means of which the leading end of the tube is fed into the bite of the guide-rolls 11 and 12. The geared relation of the drawing-rolls and of the striker is such that a suitable length of tubing is fed forward at each revolution of the striker, which severs the blank in the usual way. The succeeding blanks are fed alternately to the upper end and the lower sets of folding devices by means of the operation of the gripper 16, as hereinbefore described. The blanks pass from the guiding-rolls to the feed-rolls, by means of which the blanks are fed into correct register with the bottom-folding devices. At this time the blades 48 and 49 are folded over in their forward position upon the tuck-blades 38 and 39, the slides 40 and 41, upon which those blades are mounted, being retracted to their outer position, thus holding the inner points of the blades outside of the path of travel of the blank. When the blank reaches the proper position, the presser-plate 33 is brought down upon it, clamping it to the folding-bed. Then the box-blades 48 and 49 are turned by means of their cams 42 and 43 from the position shown in the upper portion of Fig. 3 to that shown in the lower portion thereof, folding the upper ply of the blank back over the front edge of the presser-plate, which thereby defines in the well-known way the characteristic primary transverse fold-line of the blank, the front edge of that plate extending substantially to the line of the axes of the shafts 50 and 51, upon which the blades 48 and 49 oscillate. The side-folder plates 58 and 59, which during the operation of the box-blades have stood in the position shown in the upper mechanism of Fig. 3, are now folded toward each other down upon the blank to the position shown in Fig. 4, the tuck and box blades having meanwhile been withdrawn, as shown in that figure. The delivery-roll 69 is then brought by its cam into contact with the rotating delivery-roll 70, by means of which the blank is delivered from the folding-bed, the presser-plate 33 releasing its grip upon the blank when the latter is securely seized by the delivery-rolls.

Figures 8, 9, 10:
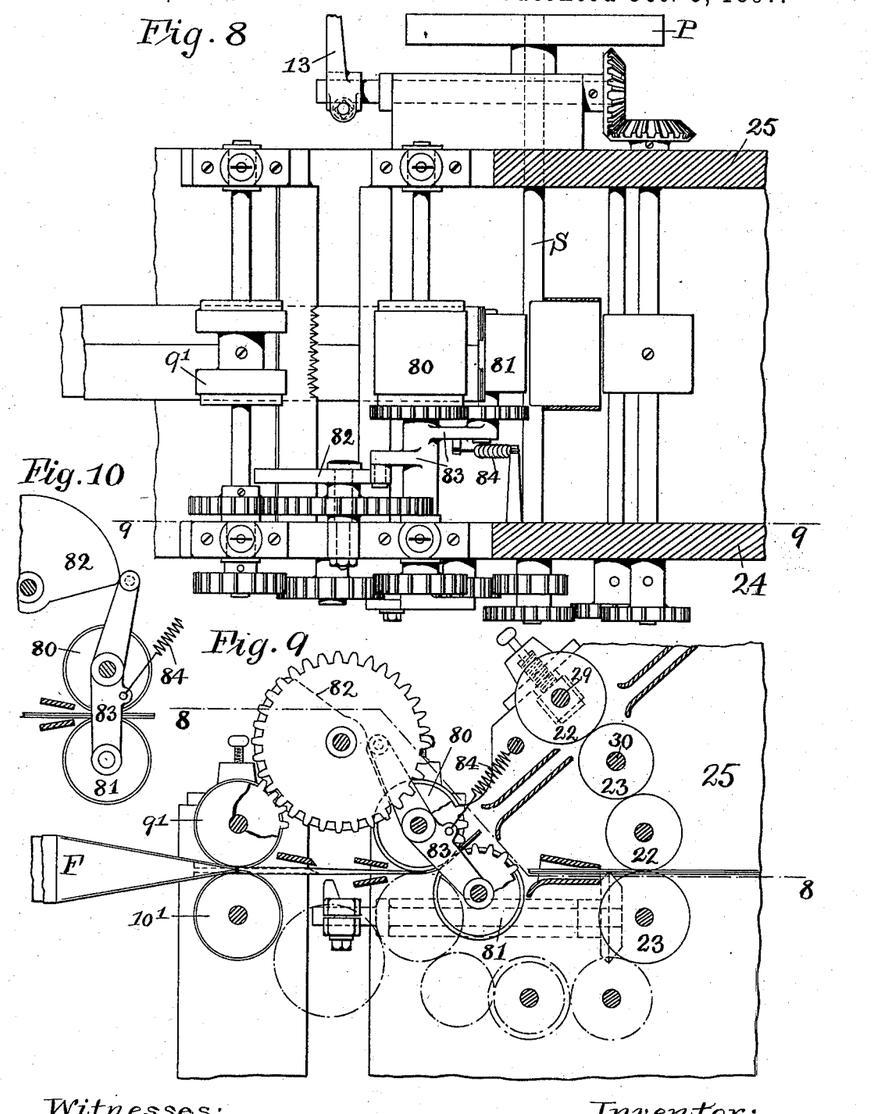

In Figs. 8, 9, and 10 is shown a modification of my guiding or deflecting devices for feeding the blanks alternately to the two sets of bottom-folding mechanisms. In that modification the function of the guide-rolls 11 and 12 is performed by the guide-rolls 80 and 81 under the control of the cam 82. The rolls are geared to rotate at a speed uniform with that of the drawing-rolls 9' 10', while the cam 82 is so geared as to make half a rotation for each of the blanks fed through by the guide-rolls. The lower guide-roll 81 is pivotally mounted upon an arm 83, which is journaled concentrically with the drawing-roll 80, and is provided with a lever adapted to engage with the cam 82. The arm 83 is held into contact with the cam 82 by means of a spring 84, attached between that arm and a convenient fixed portion of the framing. While feeding the blanks to the lower set of bottom-folding devices, the arm 83 and the roll 81 are held by the cam 82 in the position shown in Fig. 10, thus allowing the blank to be fed straight forward; but when the succeeding blank reaches the guide-roll 81 the latter is moved by means of its cam to the position shown in Fig. 9, so as to move the plane of the axes of the two guide-rolls out of its vertical position, thereby deflecting the blank from its straight course and guiding it to and between the upper guide-plates and feed-rolls which convey that blank to the upper set of diamond-folding devices.

Figure 11:
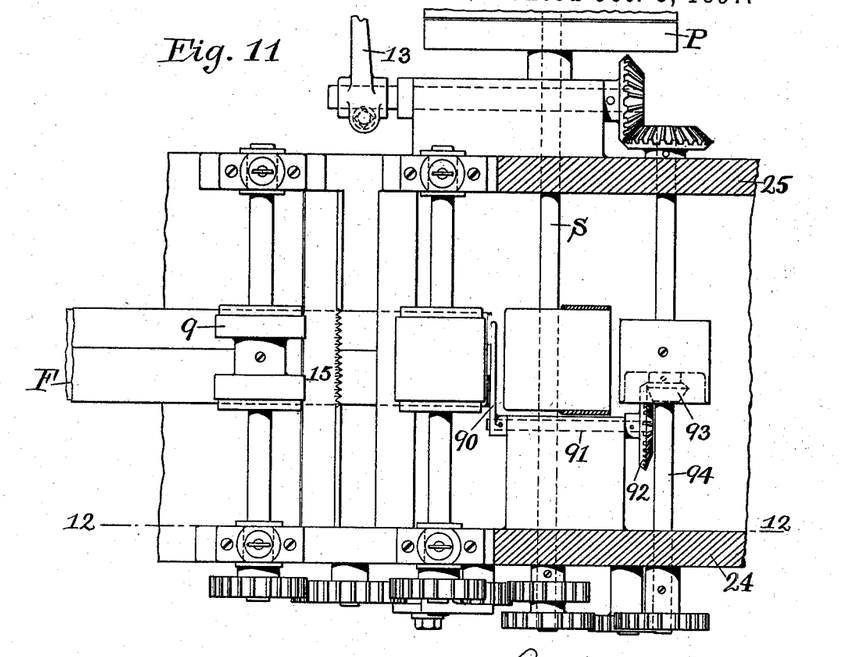
Figure 12:
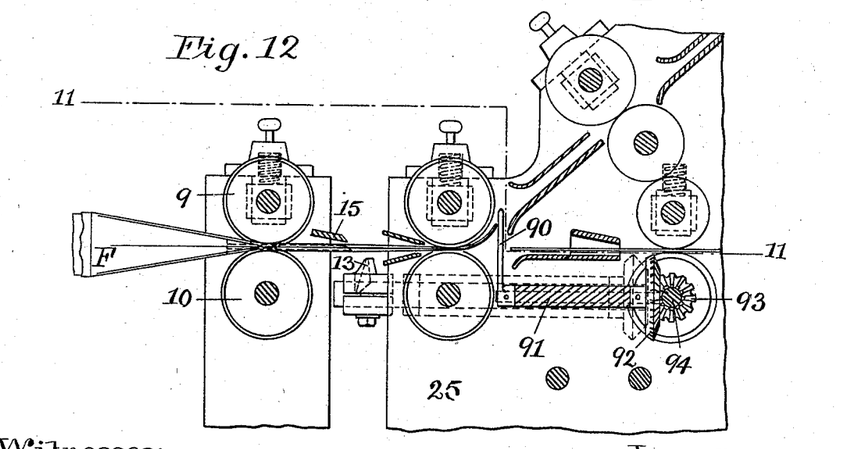
Fig. 12 is a side view, of another modified arrangement of my blank-switching devices.

In the modification of my switching or deflecting device shown in Figs. 11 and 12 the front ends of the alternate blanks are deflected upward by means of the revolving arm 90. That arm is fixed upon the horizontal shaft 91, driven by means of the bevel-gears 92 93 from the shaft 94. The ratio of the bevel-gears is made two to one, whereby the deflecting-arm 90 makes one rotation during the time that two blanks are fed through by the drawing-rolls, and it therefore only deflects the alternate blanks to and between the guide-plates leading to the upper set of bottom-folding devices, the deflecting-arm being out of the way when the remaining alternate blanks pass through, thus allowing them to be guided straight through to the lower set of bottom-folding devices.

It is obvious that more than two sets of diamond-folding devices may be employed in connection with a single former by suitably arranging them with relation thereto and providing suitable means for deflecting each of the succeeding blanks in turn to their respective folding mechanisms.

The guiding or deflecting devices herein shown may be employed in connection with other types of diamond-folding devices than that shown herein. It may, for example, be employed in connection with a plurality of either of the devices shown in United States Letters Patent to W. A. Lorenz and W. H. Honiss, of March 16, 1886, Nos. 337,964, 337,965, and 337,966. The diamond-folding devices shown in these patents operate in conjunction with reciprocating folding-beds or carriages; but when employed in connection with the guiding or deflecting devices of my present invention these folding-beds may be held in a stationary position, the cams and other moving parts being suitably modified in view of the fact that in such a new arrangement they would no longer be required to follow the reciprocations of their respective carriages or folding-beds.

I claim as my invention—

1. In combination with tube-forming mechanism, and with means for severing blanks therefrom, a pair of rotating guide-rolls, an arm on which one of the rolls is journaled, the arm being mounted to oscillate upon an axis substantially concentric with that of the other guide-roll, and a cam for oscillating that arm at the alternate rotations of the guide-rolls, thereby deflecting the alternate blanks out of their straightforward course.

2. In combination with means for making paper-bag blanks, two sets of diamond-folding devices operating in conjunction with stationary folding-beds, with means for guiding the succeeding blanks alternately to the two sets of folding mechanisms.

3. The combination of a stationary folding-bed, a presser-plate for clamping the bag-blanks thereon, oppositely-disposed tuck and box blades for forming the diamond folds, side-folder plates for flattening those folds, means for feeding the succeeding blanks into register upon the stationary folding-bed, and means for delivering them therefrom at the completion of the bottom-folding operation.

4. In combination with a single set of devices for making paper-bag blanks, two or more stationary folding-beds, each provided with a presser-plate for clamping a bag-blank thereon, oppositely-disposed box and tuck blades for forming the diamond folds, and side-folder plates for flattening down those folds, with switching or guiding devices arranged and operating to guide the succeeding bag-blanks from their forming device to each of the stationary folding-beds in regular sequence, substantially as described.

5. In a paper-bag machine, in combination with a stationary folding-bed, devices operating in conjunction therewith to form the diamond fold upon a stationary bag-blank, a rotating delivery-roll mounted upon the folding-bed beneath the blank, and a laterally-movable roll, with means whereby it is carried out of the path of the blank during its folding operation, and whereby it is moved into coöperative relation to the rotating roll at the conclusion of the folding operation, so as to grip the completed blank between them and deliver it from the machine.

6. In a paper-bag machine, in combination with the bottom-folding devices thereof mounted upon and operating in conjunction with a stationary folding-bed, a blank-delivering device therefor consisting of a rotating delivery-roll journaled in the stationary folding-bed, beneath the position of the blank, and a coacting delivery-roll therefor mounted upon an arm, with means for moving the arm, whereby its delivery-roll is carried out of the path of movement of the blank during the folding operation, and is brought down upon the blank at the completion of that operation, thereby engaging the flattened blank between the two rolls and delivering it from the machine, substantially as described.

7. In combination with tube-forming mechanism and with means for severing blanks therefrom, a plurality of stationary folding-beds for supporting the blanks, each bed being provided with a presser-plate for stopping the blank in suitable position and clamping it to its bed, with guiding or deflecting devices for directing the severed blanks in proper succession to each of the stationary folding-beds.

WILLIAM A. LORENZ.

Witnesses:
JENNIE NELLIS,
W. H. HONISS.